Patented Feb. 16, 1932

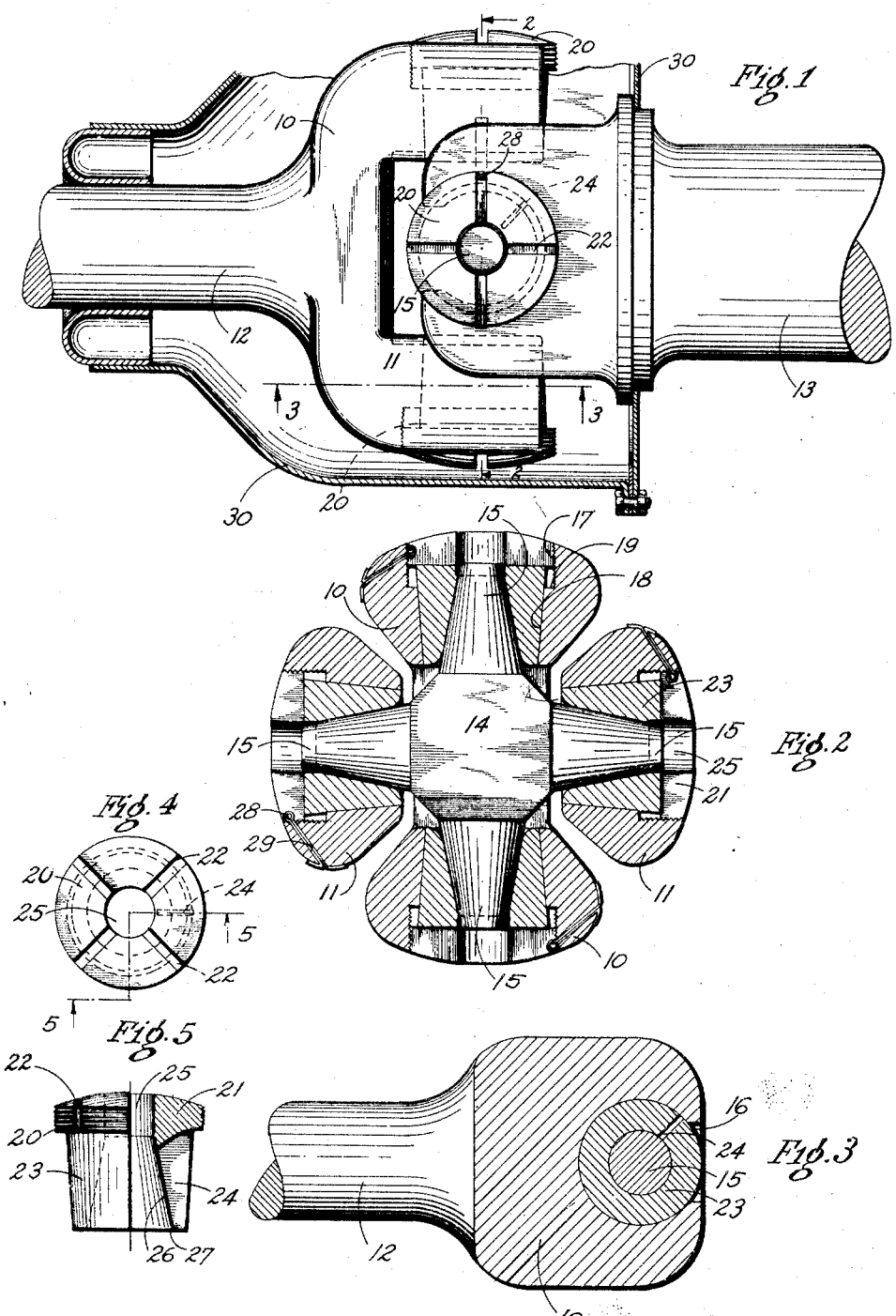

1,845,794

UNITED STATES PATENT OFFICE

MAX L. JEFFREY, OF CLEVELAND, OHIO

UNIVERSAL JOINT

Application filed December 10, 1928. Serial No. 324,882.

This invention relates to universal joints of the type comprising two opposed yokes connected by an intermediate floating member, one of said yokes being carried by a driven shaft, the other by a driving shaft.

One of the objects of my invention is to provide a universal joint which is adapted to accommodate ready and quick adjustment so as to take up wear resulting from long running periods without the necessity of renewing any parts.

Another object of this invention is to provide a universal joint which is durable of construction, economical of manufacture and so organized as to facilitate lubrication of the elements subjected to wear.

Further objects and advantages of my invention will appear from the following specification in conjunction with the accompanying drawings, wherein Fig. 1 is a side elevation of the assembled joint;

Fig. 2 is a view partly in cross section and partly in elevation, the section being taken on a plane indicated by the line 2—2 of Fig. 1, looking in the direction of the arrows;

Fig. 3 is a cross section through one arm of the yoke of the driving member, taken on a plane indicated by the line 3—3 of Fig. 1, looking in the direction of the arrows, part of the driving shaft being shown in elevation;

Fig. 4 is a detail view illustrating an end elevation of a bearing bushing; and

Fig. 5 is a side view, partly in section and partly in elevation, of the same element, taken on line 5—5 of Fig. 4, looking in the direction of the arrows.

Referring particularly to Fig. 1, the external appearance and general arrangement of my improved universal joint are of the usual type, consisting of a pair of opposed two-armed yokes, 10 and 11, carried upon the end of a driving shaft 12, and a driven shaft 13, respectively, facing one another at right angles, connected to and by a cruciform spider 14, Fig. 2, having four truncated conical arms or trunnions 15, each coaxial pair of trunnions engaging one of the yokes, in the manner usual in this art, as will be readily apparent from Figs. 1 and 2.

Both arms of each yoke are bored through, on a common axis perpendicular to the shaft axis with a bore which is open at one side through the end of the yoke arm, as shown at 16, Fig. 3, and which is divided with distinct outer and inner sections 17 and 18 connected by a shoulder 19. The outer section 17, which is cylindrical and relatively shallow, is internally screw-threaded, while the inner section 18, which is deeper, tapers inwardly, forming a seat for a bearing bushing 20.

Each bushing comprises a relatively short straight-sided externally threaded head 21, herein shown as slightly crowned and having tool-engaging means such as the cross slots 22, and a sleeve or skirt 23 which is longer and of less diameter than the head 21 and is externally tapered to seat in the bore taper 18 when the head 21 is screwed into the outer bore section 17. This sleeve 23 is split, as at 24, Fig. 5, from its bottom or smaller end up to but not through the head 21, giving circumferential resiliency to the sleeve, thus allowing a tight fit in the seat 18, and also providing a lubricating channel. The inner surface of each bushing comprises a short central aperture cylindrical as at 25 through the head 21 and slightly therebelow, and a longer conical flaring continuation 26 ending in an outwardly chamfered edge 27 at the bottom of the sleeve 23. The cylindrical portion 25 is of slightly larger diameter than the small end diameter of each trunnion 15. By reason of this arrangement and of the chamfered bottom edge 27, shouldering of either the trunnion or the bushing due to wear is avoided, longitudinal adjustments are readily made, and free access of lubricant is allowed at each end of the trunnion. The outer taper of the sleeve 23, corresponding to the taper of the seat 18, is slower than the inner taper 26, with the result that the sleeve 23 seats very tightly in its arm of the yoke, practically freezing therein, and preventing any appreciable thrust load from coming upon the screw thread. The inner taper 26 is sufficiently steeper than the outer taper of the sleeve 23 so that when the bushing is screwed into the bore 17 a very considerable binding effect will be produced between the outer surface of the bushing and the yoke before any binding effect is produced between the inner taper portion of the bushing and the spider arm. If the tapers of both surfaces were the same the binding effect would be the same for any adjustment of the bushing. However, by providing different tapers I am enabled to secure a gripping action between the outer surface of the bushing and the yoke where it is desirable and advantageous without producing any undesirable gripping or freezing action between the inner surface of the bushing and the spider arm.

For making other adjustments in my improved universal joint it is only necessary to turn the bushing 20 by means of a screw driver in one of the head slots 22, thus screwing the head and sleeve in or out of the bore until the appropriate degree of tightness of the trunnions is secured. A cotter pin 28 engaging either end of either slot 22 and fastended through a hole 29 in the side of the yoke, secures the head 21 against turning. In each yoke all the elements of each seat and of each bushing are symmetrical with respect to a common axis, thereby making each pair of bearings self-aligning, and also simplifying manufacture.

The relative depth of the trunnion 15 and of the trunnion seat 26 and the relative depth of the bushing head 21 and of the threaded portion 17 of the bore are all such as to permit a wide range of adjustment so that it will seldom become necessary to replace any wearing parts. The entire joint is fitted with a housing 30, Fig. 1, of the usual type, to exclude dirt and to hold lubricating material. By reason of the open ended construction of the yoke arm, illustrated at 16, Fig. 3, and by reason of the slots 24, in the bearing sleeves 23, free access of lubricant to the trunnions is possible at all times. Lubricant can also reach the trunnions at their inner and outer ends through the cylindrical hole 25 in the top of the bushing and around the chamfer 27 at the bottom.

Having described a preferred embodiment of my invention it is to be understood that I do not limit myself thereto but that what I claim is:

1. In a universal joint, in combination, a bearing bushing comprising an adjusting head and a sleeve attached thereto, said sleeve including inner and outer surfaces comprising coaxial truncated cones one within the other and oppositely disposed, the generatrix of said outer surface forming a more acute angle with the axis than does the generatrix of said inner surface.

2. In a universal joint, in combination, a bushing comprising a relatively short externally threaded head and a sleeve extending therefrom, said sleeve having the external form of a truncated cone and being internally bored through axially, said bore comprising a conical taper slightly shorter than said sleeve and a coaxial cylindrical portion extending from the smaller end of said taper through said head.

3. In a universal joint, in combination, a bushing comprising a relatively short externally threaded head and a sleeve extending therefrom, said sleeve being longitudinally split below said head, said sleeve having the external form of a truncated cone and being internally bored through axially, said bore comprising a conical taper, chamfered around the larger edge and slightly shorter than said sleeve and a coaxial cylindrical portion extending from the smaller end of said taper through said head.

4. In a universal joint, in combination, a bearing bushing including a sleeve, a spider arm journalled therein, lubricant channels at opposite ends of said sleeve adjacent the ends of said spider arm, and a combined lubricant channel and adjusting slit in the side of said bushing.

5. In a universal joint, in combination, a bushing comprising a relatively short externally threaded head and a sleeve extending therefrom, said sleeve having the external form of a truncated cone and being internally bored through axially, said bore comprising a conical taper slightly shorter than said sleeve and a coaxial cylindrical portion extending from the smaller end of said taper through said head, and a trunnion, the smaller end of said trunnion projecting into said cylindrical portion.

6. In a universal joint, a clevis, bushings received within the apertures of said clevis, said bushings each having an outer tapered surface having screw threads adjacent its larger end and having an axial bore, said bore being cylindrical adjacent the threaded end of the bushing and tapered at the other end with the largest diameter adjacent the small end of the bushing, said bushing being split for the length of its outer tapered portion only.

In testimony whereof I hereunto affix my signature this 6th day of December, 1928.

MAX L. JEFFREY.